June 28, 1949.                    L. E. SEGESMAN                    2,474,439
                                  ELECTRIC MOTOR
Filed Sept. 3, 1947                                              2 Sheets-Sheet 1

INVENTOR.
Louis E. Segesman
BY
Harry S. Dunasse
                ATTORNEY.

June 28, 1949.  L. E. SEGESMAN  2,474,439
ELECTRIC MOTOR

Filed Sept. 3, 1947  2 Sheets-Sheet 2

INVENTOR.
Louis E. Segesman
BY
Harry S. Durance
ATTORNEY.

Patented June 28, 1949

2,474,439

UNITED STATES PATENT OFFICE 2,474,439

ELECTRIC MOTOR

Louis E. Segesman, Canton, Ohio, assignor to The Hoover Company, North Canton, Ohio, a corporation of Ohio Application September 3, 1947, Serial No. 771,831

10 Claims. (Cl. 172—36)

The present invention relates to the art of electric motors, and more particularly to a motor mounting and ventilating structure having general application but especially designed for application to portable electrical apparatus such as suction cleaners.

It is an object of the present invention to provide a motor construction which is assembled by a simple telescoping of parts which automatically fit into each other to a required depth, and which also serve to align the motor bearings automatically.

It is a more particular object of the present invention to provide a motor field stack mounting assembly in which the field stack is mounted in a shroud element which serves not only to support and position the stack in the outer motor housing, but also forms a cooling air passageway through the field stack and cooperates with an end wall structure of the motor housing to form a cooling air fan chamber.

Other and more particular objects of the invention will become apparent as the description proceeds when taken in connection with the accompanying drawings, in which.

Figure 1:
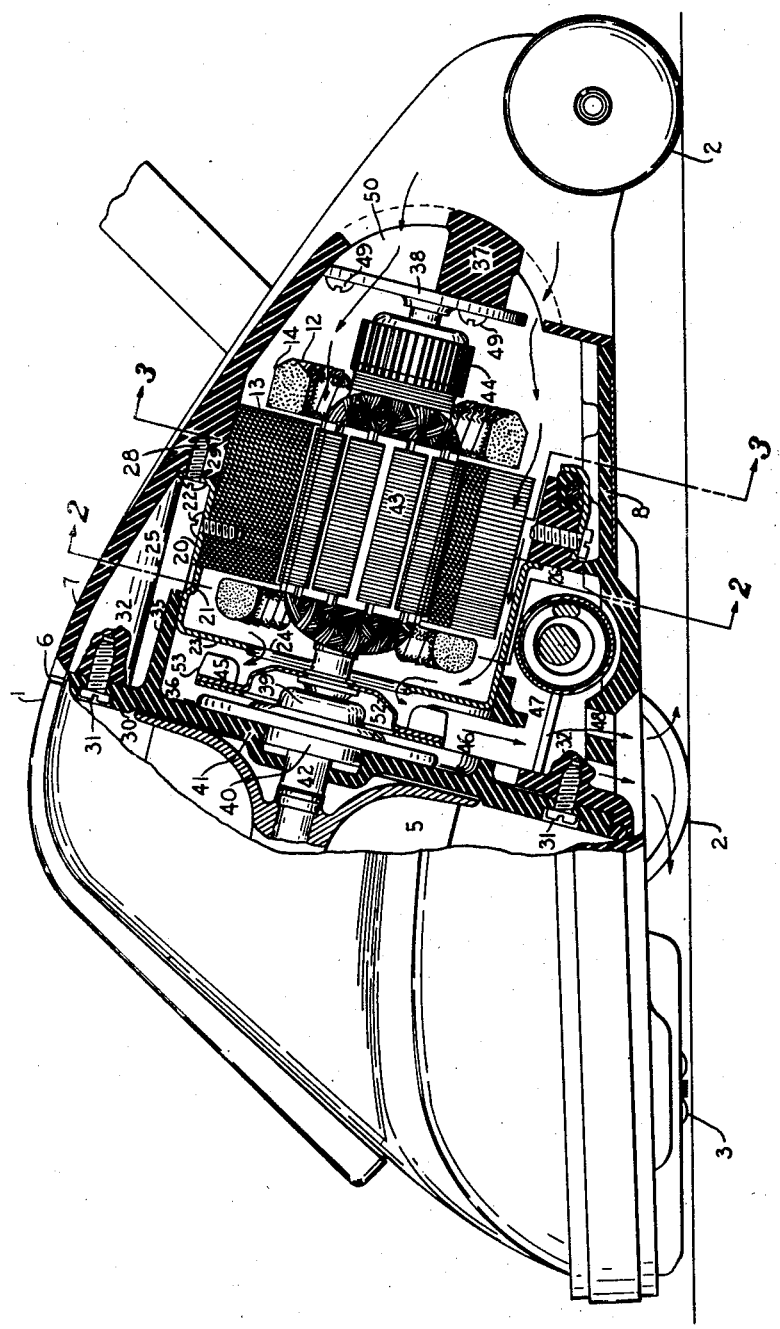
Figure 1 is a side elevational view partly in section showing the present invention applied to a suction cleaner.

In the illustrated embodiment of the invention there is shown in outline a suction cleaner housing indicated generally at 1 which is provided with supporting wheels 2, a suction mouth 3 and a suction-creating centrifugal fan 5. The housing 1 is split into two parts along the line 6 which are secured together by means, not shown, which form no part of the present invention. The rear half of the housing 1 which comprises the motor housing is generally indicated at 7 and is preferably molded of non-conducting material such as phenolic condensation products and the like.

The housing may, if desired, be cast entirely in one piece open only at the end 6. However, when applied to a suction cleaner it is preferable to make the bottom wall 8 removable and secure the same to the side walls 9 and 10 of the housing 7 by any suitable means not shown.

Figure 3:
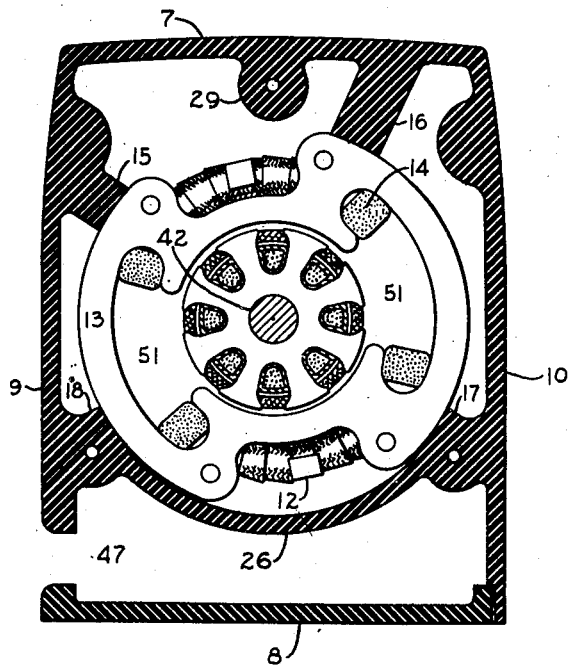
Figure 3 is a further transverse sectional view taken substantially along the line 3—3 of Figure 1 looking in the direction of the arrows.

A motor field stack assembly 12 comprising field laminations 13 and windings 14 is positioned within the interior of the housing 7. As shown in Figure 3 a plurality of integral lugs 15, 16, 17, and 18 project inwardly of the housing 7 and engage the periphery of the field stack laminations 13 to position the same within the housing 7. The projections 15 to 18 inclusive engage that portion of the field stack which is adjacent the rear or commutator end of the motor. The forward portion of the field stack assembly is telescopically received within a metallic cylindrical shroud and positioning member 20 which is provided with a plurality of inwardly pressed tongues 21 to engage the end face of the lamination structure 13 and thus limit the amount by which the members 13 and 20 telescopically interengage with each other. A cap screw 22 secures the parts 20 and 13 together against rotation and displacement. The fit between the members 13 and 20 is a force fit so that the engagement between the two has sufficient frictional resistance to prevent chattering and accidental separation.

The shroud member 20 is cup-shaped having an end wall 23 positioned beyond the forward end of the motor structure proper and provided with a large central opening 24 for a purpose to be hereinafter described.

The end of the shroud member 20 which telescopically receives the motor field structures is provided with an outwardly projecting radial flange 25 which engages with the top and side walls of the housing 7 and abuts against the front transverse faces of the lugs 15 to 18 and 29, and the inner bottom housing wall 26 which forms the bottom of the motor chamber proper. The engagement between flange 25 and housing forms an air seal around the motor between the front and rear portions of the housing 7. Preferably, but not necessarily, the lugs 15 to 18 extend longitudinally from the plane of the flange 25 to the rear end of the field iron 13. Suitable cap screws 28 pass through the flange 25 into the positioning lugs 18 and 17 at the lower side portions of the housing 7 and into a special securing lug 29 integral with the top portion of the housing 7 to secure the motor field stack assembly to the motor housing 7.

The open end of the casing 7 is closed by an end plate 30 preferably molded from the same material as the casing itself. The plate 30 is secured to casing 7 by cap screws 31 which extend into suitable projections 32 formed integrally upon the interior walls of the casing 7. The end plate 30 is formed with an inwardly projecting cylindrical flange 35 which embraces the outer cylindrical portions of the shroud 20 to form additional support for the field stack structure and to insure proper alignment of plate 30 and the field stack structure. The end wall 23 of the shroud plate 20 is positioned within the confines of the cylindrical wall 35 and is spaced from the plate 30 to form a fan chamber 36 between the shroud 20 and the plate 30.

A bearing structure indicated generally at 38 is supported in the housing 7 at the rear end thereof upon a rear bearing seat 37 which is molded to seat the rear bearing structure 38 accurately concentrically of the field stack positioning lugs 15 to 18. The holes receiving cap screws 49 may be molded in seat 37 to form the means insuring proper positioning of the bearing 38. A front bearing structure 39 is provided with a forwardly projecting collar 40 which seats within a recess 41 in the front closure plate 30 to align the same with the rear bearing structure 38. Suitable screws or bolts, not shown, may be provided to secure the bearing 39 to the plate 30. The shaft 42 of a motor rotor structure 43 is supported in the bearings 38 and 39. As shown the rotor structure includes a commutator 44, however, the particular form of motor forms no part of my invention and may be any type of electrical motor. The shaft 42 extends through the closure plate 30 of the housing 7 and supports the centrifugal fan 5 on its outer end within the casing structure 1.

A small centrifugal cooling air fan 45 is rigidly secured to the shaft 42 in the chamber 36 in any desired manner. The opening 24 in the shroud plate 20 forms the air inlet opening for the fan 45. The fan 45 discharges through an opening 46 formed in the flange 35 of the plate 30. The opening 46 communicates with a lower chamber 47 in the housing 7 and the cooling air for the motor exhausts through outlet 48 formed in the bottom closure plate 8.

A cooling air inlet 50 is formed in the rear end of the housing 7 to admit cooling air into the end of the motor structure supported by the bearing 38. Cooling air flows axially of the motor, around the rotor and through the various openings formed in the field structure, to the inlet 24 of the fan chamber 36. The flange 25 of the shroud plate structure 20 seals the front and rear portions of housing 7 from each other except through the motor structure, hence all air which reaches the inlet 24 of the fan 45 is drawn through the opening 50 at the rear of housing 7 across and around the motor structure and thence to the fan chamber. In this way the shroud structure 20 not only positions the field stack structure of the motor relative to the housing 7 and plate 30, but also forms an important portion of the air directing system for the motor as well as the fan eye and one wall of the cooling fan chamber.

Figure 2:
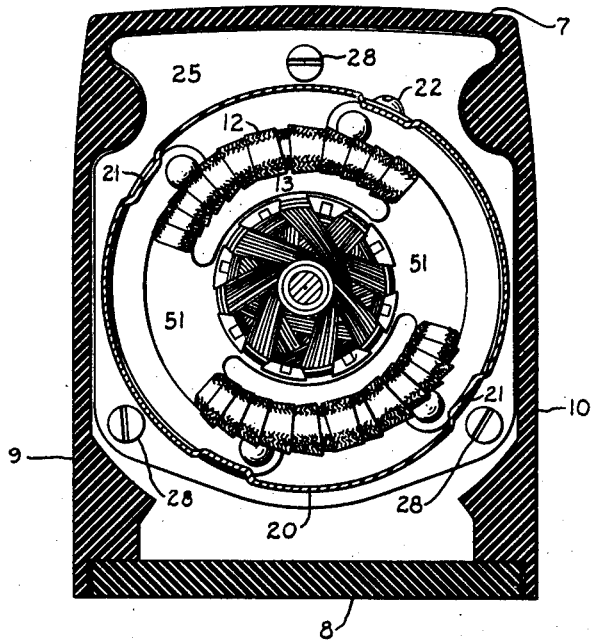
Figure 2 is a transverse sectional view taken substantially along the line 2—2 of Figure 1 looking in the direction of the arrows.

It will be noted from Figures 2 and 3 that cooling air induced to flow through the motor by the fan 45 flows over and around the commutator 44 and then through the air gap separating the rotating and stationary parts of the motor. Additionally, the air can flow through the spaces 51 formed in the stack structure 13 so as to cool the iron of the stack structure as well as the field windings of the motor.

The fan 45 consists essentially of a dished plate 52 secured to the shaft 42 and provided with an annular peripheral portion carrying fan blades 53. By this construction the front bearing structure 39 is shielded from the fan and in part set into the dished portion of the fan plate 52.

With the construction above described cooling air drawn in from the rear of the motor picks up dust from the commutator brushes and directs it away from the rear bearing 38. Such brush dust is prevented from striking the front bearing by the solid plate construction of the ventilating fan and is then exhausted from the chamber 36 by centrifugal action without being permitted to contact the front bearing 39. This arrangement for protecting both front and rear bearings from contact with dust from the commutator brushes has been found to be highly advantageous in increasing bearing life and operating efficiency of the motor.

The mounting and assembly of the motor field structure is simple and easy of achievement. After the field stack structure proper is assembled and riveted and the windings placed it is pressed into the shroud plate 20 until the tongues 21 engage the end face of the field stack. The screw 22 is then secured in position to lock the shroud plate and stack assembly together. The bearing 38 is then mounted in the motor housing 7. The assembled field stack structure and shroud 20 is next telescoped into the motor housing 7 until the peripheral flange on the shroud plate engages the seats 26 and 29 after which the securing bolts 28 are driven home. The motor rotor shaft assembly, front bearings, fans 5 and 45 and front plate 30 are next assembled as a sub-assembly. When this sub-assembly is complete the same is then assembled with the housing 7 and field stack assembly by longitudinal movement which telescopes the end of the shroud plate 20 into the flange 35 of the closure plate 30 for the motor housing. The commutator end of the motor shaft is seated in the bearing 38 and the sub-assembly is then secured to the housing 7 by the securing screws 31. Motor brushes may be mounted, for example, in suitable supports formed integrally with side walls 9 and 10 of the housing 7.

In motor structures having plastic housings conventional means of securing and aligning the various parts of the motor are unsatisfactory. The low strength of molded plastics compared to metal casings substantially precludes the use of a few through bolts to secure and align all parts of the motor structure. With plastic housings the bearings are readily mounted in end walls or plates and may be aligned by accurate construction of the molding dies for the plastic housing and end wall or walls. Removable walls may also be molded to interfit accurately with each other. The stator structure, however, requires large bearing areas on the plastic housing and must also provide for the flow of a large quantity of cooling air around the parts of the motor proper.

The present invention realizes the objectives above mentioned in a simple economical structure which is easily assembled. The lugs 15 to 18 provide large area accurate positioning and supporting means for the field stack. The shroud structure 20 may be manufactured to close tolerances and not only provides additional support for the field structure but insures accurate alignment of the front and rear bearings for the motor by reason of the concentric telescoping relation of the field stack, shroud 20, lugs 15 to 18, flange 35, front bearing seat 41, front bearing 40, and rear bearing seat 37. Correct longitudinal positioning of the parts is simply and easily secured by the action of tongues 21, bolt 22, and studs 28 and 31 and the seats formed on housing 7 for the flange 25, bearing 38, and front plate 30.

The present construction is especially advantageous because of the manner in which the motor mounting and positioning elements, specifically the shroud cup 20 and the flange 35 on the motor housing end plate, not only positively position and support the stack assembly of the motor, but also form air ducts to direct cooling air in defined paths over the various parts of the motor to insure adequate cooling thereof. These parts shield the front bearing from brush dust and also form the housing for the centrifugal cooling air fan and direct the exhaust air outwardly of the inner motor compartment into the outer housing and through suitable openings therein to the exterior.

The exterior configuration of the casing 7 as shown is especially designed for a suction cleaner but the casing 7 may have other cross sectional configurations without departing from the invention. The space 47 is created partly by the dictates of exterior style and partly to house other appurtenances of a suction cleaner not pertinent to the present invention. This space and the plate 8 may be eliminated by extending the wall 26 rearwardly to join the rear wall of the housing 7 and by extending the wall 26 forwardly in radially spaced relation to the shroud cup 20 to form a seat and securing face for the plate 30. In the last mentioned arrangement the wall 26 will be formed with openings corresponding to openings 48 to exhaust cooling air from the housing 7.

While I have shown but a single embodiment of my invention it is to be understood that this embodiment is to be taken as illustrative only and not in a limiting sense. I do not wish to be limited to the specific structure shown and described but to include all equivalent variations thereof except as limited by the scope of the claims.

I claim:

1. In a motor construction, a housing element constructed of non-conducting material and having a portion adjacent one end thereof formed to support a motor bearing structure, a bearing structure in said support, a removable wall of non-conducting material for closing the end of said housing remote from said one end, a motor bearing structure mounted on said removable wall, a motor field stack assembly, a metallic member having a cylindrical wall encasing and secured to a portion of the peripheral wall of said field stack assembly, means securing said metallic member to said housing element, a cylindrical flange on said removable wall member engaging said metallic member, and a motor rotor assembly supported within said field stack assembly by said bearings.

2. In a motor construction, a housing element constructed of non-conducting material and having a portion adjacent one end thereof formed to support a motor bearing structure, a bearing structure in said support, a removable wall of non-conducting material for closing the end of said housing remote from said one end, a motor bearing structure mounted on said removable wall, a motor field stack assembly, a metallic member having a cylindrical wall encasing and secured to a portion of the peripheral wall of said field stack assembly, inwardly extending projections formed on said housing engaging and supporting the portion of said field stack assembly not encompassed by said metallic member, means securing said metallic member to said housing element, a cylindrical flange on said removable wall member engaging said metallic member, and a motor rotor assembly supported within said field stack assembly by said bearings.

3. In a motor construction, a housing element constructed of non-conducting material and having a portion adjacent one end thereof formed to support a motor bearing structure, a bearing structure in said support, a removable wall of non-conducting material for closing the end of said housing remote from said one end, a motor bearing structure mounted on said removable wall, a motor field stack assembly, a metallic member having a cylindrical wall encasing and secured to a portion of the peripheral wall of said field stack assembly, and an end wall spaced from the end of said motor field stack assembly and provided with a central opening, means securing said metallic member to said housing element, a cylindrical flange on said removable wall member engaging said metallic member, said end wall of said metallic member being spaced from said removable wall within said cylindrical flange to form a fan chamber, a motor rotor assembly including a fan positioned in said fan chamber supported within said field stack assembly by said bearings.

4. In a motor construction, a housing element constructed of non-conducting material and having a portion adjacent one end thereof formed to support a motor bearing structure, a bearing structure in said support, a removable wall of non-conducting material for closing the end of said housing remote from said one end, a motor bearing structure mounted on said removable wall, a motor field stack assembly including a motor field structure and a cylindrical element encompassing a part of said field structure and extending beyond one end thereof, an outturned flange on the end of said cylindrical element encompassing said field structure, inwardly projecting positioning lugs on said housing engaging the unencompassed part of said field structure, seats formed on said housing abutting said outturned flange, means securing said flange to said housing, and an inwardly projecting flange on said removable end wall telescopically engaging the projecting position of said cylindrical member.

5. In a motor structure, a housing of non-conducting material, a motor field structure telescopically engaged with the interior of said housing adjacent one end of said field structure, a mounting cylinder telescopically engaging the other end of said field structure and secured to said housing, a removable end wall on said housing having a part telescopically engaging said mounting cylinder, and means on said housing and said cylindrical member for positioning said field structure with respect to all of said telescopically engaging members.

6. In a motor structure, a housing of non-conducting material, a motor field structure telescopically engaged with the interior of said housing adjacent one end of said field structure, a mounting cylinder telescopically engaging the other end of said field structure and secured to said housing, a removable end wall on said housing having a part telescopically engaging said mounting cylinder and a depressed tang formed in said cylinder engaging one end of said field structure.

7. A motor structure comprising a molded plastic housing formed at one end with a bearing seat and bearing positioning means, a motor bearing on said bearing seat, said housing also having a plurality of inwardly projecting field stack supporting means arranged to position a field stack concentrically of said bearing, a field stack mounted in said inwardly projecting means, a shroud engaging a part of said field stack concentrically thereof and concentric with said bearing, a molded plastic end plate for said housing having a bearing seat formed therein, a motor bearing mounted in the bearing seat in said end plate, means projecting inwardly of said end plate concentrically of said bearing and telescopically engaging said shroud concentrically with said field stack.

8. A motor comprising, a housing having a bearing support at one end and a removable wall at its other end, motor bearings mounted in said bearing support and said end wall in axial alignment, a field stack in said housing spaced from said end wall and said bearing support, spaced inwardly projecting lugs on said housing engaging the outer surface of the portion of said field stack nearest said bearing support, a cylindrical member telescopically receiving the portion of said field stack remote from said bearing support and extending beyond said stack toward said end wall and terminating in an inwardly extending annular radial flange spaced from said end wall, a radial flange on said cylindrical member secured to said housing and contacting the inner surface thereof to separate said casing into two parts, a cylindrical flange on said end wall telescopically receiving said extending portion of said cylindrical member and forming a fan chamber with the flanged end thereof, an opening in said cylindrical flange forming an air outlet, an air exhaust opening in said housing communicating with said air outlet opening, and air inlet means in said housing adjacent said bearing support.

9. A motor comprising a tubular housing, a bearing support in one end of said housing, a field structure, a mounting cylinder telescopically receiving and frictionally engaging said field structure, a radial flange on said mounting cylinder secured to said housing, a removable end wall on the end of said housing opposite to said bearing support, means projecting inwardly of said housing from said end wall engaging the surface of said mounting cylinder, motor bearings positioned in axial alignment in said bearing support and said end wall and a motor rotor journaled in said bearings and positioned within said field structure.

10. A motor structure comprising a motor housing having a removable wall at one end thereof and a motor bearing support at the other end thereof, motor bearing in said bearing support and said removable wall, a motor structure in said housing comprising a field stack, a positioning and shroud member having a portion encompassing said field stack and secured to said housing, said shroud member also having a portion projecting toward said end wall and spaced from the end of said field stack, means on said end wall cooperating with said shroud member to form a fan chamber open to the interior of said field stack and having an outlet opening into said housing adjacent said end wall, a motor rotor assembly supported on said bearing having a cooling air fan in said fan chamber, said housing being provided with an air exhaust opening adjacent the outlet of said fan chamber and an air inlet opening remote from said removable end wall and communicating with the interior of said field stack.

LOUIS E. SEGESMAN.

REFERENCES CITED

The following references are of record in the file of this patent:

UNITED STATES PATENTS

| Number | Name | Date |
| --- | --- | --- |
| 1,009,951 | Armstrong | Nov. 28, 1911 |
| 1,684,168 | Bethel | Sept. 11, 1928 |
| 1,768,083 | Lansing | June 24, 1930 |
| 2,314,334 | Frantz | Mar. 23, 1943 |